US006851281B2

United States Patent
Sen et al.

(10) Patent No.: US 6,851,281 B2
(45) Date of Patent: Feb. 8, 2005

(54) METHOD OF FABRICATING RARE EARTH DOPED OPTICAL FIBRE

(75) Inventors: Ranjan Sen, Kolkatta (IN); Mrinmay Pal, Kolkatta (IN); Mukul Chandra Paul, Kolkatta (IN); Shyamal Kumar Bhadra, Kolkatta (IN); Somesh Chatterjee, Kolkatta (IN); Kamal Dasgupta, Kolkatta (IN)

(73) Assignee: Council of Scientific and Industrial Research, New Delhi (IN)

( * ) Notice: Subject to any disclaimer, the term of this patent is extended or adjusted under 35 U.S.C. 154(b) by 301 days.

(21) Appl. No.: 10/106,868

(22) Filed: Mar. 27, 2002

(65) Prior Publication Data

US 2003/0182970 A1 Oct. 2, 2003

(51) Int. Cl.[7] .............................................. C03B 37/075
(52) U.S. Cl. ............................ 65/390; 65/398; 65/399; 65/426; 65/427; 65/428; 65/477
(58) Field of Search ......................... 65/390, 426, 427, 65/378, 398, 399, 417, 419, 418, 428, 477, 397

(56) References Cited

U.S. PATENT DOCUMENTS

| | | | | |
|---|---|---|---|---|
| 5,005,175 A | * | 4/1991 | Desurvire et al. ............. | 372/6 |
| 5,058,976 A | * | 10/1991 | DiGiovanni et al. .......... | 385/24 |
| 5,123,940 A | * | 6/1992 | DiGiovanni et al. .......... | 65/395 |
| 5,151,117 A | * | 9/1992 | Bartholomew et al. ....... | 65/399 |
| 5,474,588 A | * | 12/1995 | Tanaka et al. ................ | 65/390 |
| 5,491,581 A | * | 2/1996 | Roba ........................ | 359/341.3 |
| 5,778,129 A | * | 7/1998 | Shukunami et al. ......... | 385/127 |
| 6,125,659 A | * | 10/2000 | Yang ........................... | 65/390 |
| 6,178,780 B1 | * | 1/2001 | Morita ........................ | 65/395 |
| 6,751,990 B2 | * | 6/2004 | Bandyopadhyay et al. ... | 65/378 |

* cited by examiner

Primary Examiner—Peter Chin
Assistant Examiner—Carlos Lopez
(74) Attorney, Agent, or Firm—Sughrue Mion, PLLC

(57) ABSTRACT

The present invention provides a method of fabricating rare earth doped preforms and optical fibers by a combination of modified chemical vapor deposition (MCVD) process and solution doping technique said MCVD process is used to develop matched or depressed clad structure inside a silica glass substrate tube followed by deposition of porous silica soot layer containing $GeO_2$, $P_2O_5$ or such refractive index modifiers by the backward deposition method for formation of the core and presintering the deposited particulate layer by backward pass with flow of $GeCl_4$ and/or corresponding dopant halides, soaking the porous soot layer into an alcoholic/aqueous solution of RE-salts containing codopants such as $AlCl_3$ in definite proportion, drying, oxidation, dehydration and sintering of the RE containing porous deposit and by collapsing at a high temperature to produce the preform followed by drawing the fibers by known technique to produce fibers with suitable core-clad dimensions and geometry.

24 Claims, No Drawings

METHOD OF FABRICATING RARE EARTH DOPED OPTICAL FIBRE

FIELD OF THE INVENTION

The present invention relates to a Method of Fabricating Rare Earth Doped Optical Fibres.

BACKGROUND AND PRIOR ART OF THE INVENTION

Rare-earth (RE) doped optical fibres have shown great potential for a number of applications including fibre lasers, amplifiers and sensors. In contrast to germanosilicate core silica glass optical fibres which are used for transmission of signal over long distances, the presence of RE ions in the core makes the fibres optically active due to the characteristic emission of the RE when pumped at suitable wavelengths. Lasing and amplification have been demonstrated at several wavelengths with the incorporation of the various rare-earths.

While the erbium doped fibre remains the most important for telecommunication applications, fibres doped with other rare earths are gaining importance mostly for development of laser sources from visible to mid infrared regions. The Yb doped and Er/Yb codoped fibres are of special mention in this respect for development of high power fibre lasers generating short single-frequency pulses for communication and also for industrial and medical applications.

The erbium doped fiber which is the active medium of an EDFA (erbium doped fiber amplifier) has been an enabling technology for optical networks operating in the third telecommunication window between 1530 and 1610 nm. EDFA can simultaneously amplify several optical channels in a single fibre which has enabled the implementation of DWDM (dense wavelength division multiplexing) technology with the potential of increasing the bandwidth of long distance transmission systems from Gb/s to Tb/s ranges. It exhibits high gain, large bandwidth, low noise, polarisation insensitive gain, substantially reduced cross talk problems and low insertion losses at the operating wavelengths. The deployment of EDFA has spurred a tremendous growth in advanced telecommunication systems replacing the conventional optoelectronic repeaters.

Reference may be made to Townsend J. E., Poole S. B., and Payne D. N., Electronics Letters, Vol. 23 (1987) p-329, 'Solution-doping technique for fabrication of rare-earth-doped optical fibre' wherein the MCVD process is used to fabricate the preform with a step index profile and desired core-clad structure while solution doping is adopted for incorporation of the active ion. The steps involved in the process are as follows:

A conventional cladding doped with $P_2O_5$ and F is deposited within a high silica glass substrate tube to develop matched clad or depressed clad type structure.

The core layers of predetermined composition containing index raising dopant like $GeO_2$ are deposited at a lower temperature to form unsintered porous soot.

The tube with the deposit is immersed into an aqueous solution of the dopant precursor (typical concentration 0.1 M) up to 1 hour. Any soluble form of the dopant ion is suitable for preparation of the solution although rare earth halides have been mostly used.

Following immersion, the tube is rinsed with acetone and remounted on lathe.

The core layer containing the RE is dehydrated and sintered to produce a clear glassy layer. Dehydration is carried out a temperature of 600° C. by using chlorine. The level of $OH^-$ is reduced below 1 ppm using $Cl_2/O_2$ ratio of 5:2 provided the drying time exceeds 30 min.

Collapsing in the usual manner to produce a solid glass rod called preform.

Fibre drawing is conventional.

Another reference may be made to J. Kirchhof, S. Unger, L. Grau, A. Funke & P.Kleinert, Crystal Research Technology, Vol .25, No. 2, 1990, pp. K29–K34, 'A New MCVD Technique for Increased Efficiency of Dopant Incorporation in Optical Fibre Fabrication', wherein the "alternating deposition" technique has been applied to improve the efficiency of deposition and dopant incorporation. In the above process, each single layer is built up by means of two-torch process:

1) formation of an unconsolidated $SiO_2$—layer by opposite movement of gas and torch (or by parallel movement at low temperatures), and
2) consolidation of the layer under the influence of a gaseous mixture of oxygen and dopant source without further $SiO_2$ deposition.

Yet another reference may be made to I. Kasik, V. Matejec, J. Kanka, P. Honzatko, Pure Applied Optics, Vol. 7, 1998, pp.457–465, 'Properties and fabrication of ytterbium-erbium silica co-doped silica fibres for high-power fibre lasers', wherein the backward deposition was followed for depositing the porous core layer.

Still another reference may be made to V. Matejec, I. Kasik, D. Berkova, M. Hayer, M. Chomat, Z. Berka, A. Langrova J. Kanka, P. Honzatko, Ceramics-Silikaty, Vol. 45, No. 2, 2001, pp.62–69, 'Properties of optical fiber performs prepared by inner coating of substrate tubes', wherein the porous core layer composed of $SiO_2$ and $P_2O_5$ was deposited on the inner wall of the substrate tube by the reverse deposition MCVD technique at a temperature of 1400° C. The layer was presintered in order to fix the deposit. The deposited layer was soaked with an aqueous solution of $AlCl_3$ and rare-earth chloride salts. The soaked layer was sintered at a temperature of 1000–1600° C. in the $POCl_3$ atmosphere.

One more reference may be made to European Patent No. EP 1 043 281 A1 (2000) by Tankala, Kanisha. Sturbridge Mass. (US), 'Method of fabricating preforms doped with rare earth metal for optical fibers' wherein a porous silica soot layer was deposited on inside of a silica-based substrate tube. The porous silica soot layer was immersed in an impregnation solution having rare earth elements and other codopants also. The porous silica soot layer was subsequently sintered into a glass layer. A mixture of codopant precursor and oxygen was flown over the porous silica soot layer during said sintering step. Then the tube was collapsed to make a preform.

One another reference may be made to Guillaume G. Vienne, Julie E. Caplen, Liang Dong, John D. Minelly, Johan Nilsson, and David N. Payne, Journal of Lightwave Technology, Vol. 16, No. 11, 1998, pp. 1990–2001, 'Fabrication and Characterization of $Yb^{3+}$: $Er^{3+}$ Phosphosilicate Fibers for Lasers', wherein the backward deposition was adopted to deposit the porous core layer and presintering the above layer. For the deposition of silicate or germanosilicate porous layers the burner and the reactants were co propagating. The viscosity of the soot particles was high enough to prevent them from fusing when the burner passes over, thus leaving a porous layer. On the other hand, a phosphosilicate porous layer, also called "frit", containing higher than 5 mol % phosphorous was easily fused by the burner at the deposition stage. The problem was solved by translating the burner in the opposite direction to the reactants i.e. by the backward deposition technique. There was no flow of any codopants in the presintering stage. The presintered frit was immersed in a solution of deionised water or methanol in which high purity rare-earth chlorides had been dissolved. After the solution doping the tube was dried for a certain period. Then the frit was fused by heating to around 1500° C. and the tube was collapsed to make a perform from which fibre was drawn.

A further reference may be made to DiGiovanni D. J., SPIE Vol. 1373 (1990) p-2 "Fabrication of rare-earth-doped optical fibre' wherein the substrate tube with the porous core layer is soaked in an aqueous or alcoholic solution containing a nitrate or chloride of the desired RE ion. The tube is drained, dried and remounted on lathe. The dehydration is carried out by flowing dry chlorine through the tube at about 900° C. for an hour. After dehydration, the layer is sintered and the tube is collapsed to be drawn to fibre.

Another reference may be made to Ainslie B. J., Craig S. P., Davey S. T., and Wakefield B., Material Letters, Vol. 6, (1988) p-139, "The fabrication, assessment and optical properties of high-concentration $Nd^{3+}$ and $Er^{3+}$ doped silica based fibres" wherein optical fibres based on $Al_2O_3$—$P_2O_5$—$SiO_2$ host glass doped with high concentrations of $Nd^{3+}$ and $Er^{3+}$ have been fabricated by solution method and quantified. Following the deposition of cladding layers $P_2O_5$ doped silica soot is deposited at lower temperature. The prepared tubes are soaked in an alcoholic solution of 1M $Al(NO_3)_3$+various concentrations of $ErCl_3$ and $NdCl_3$ for 1 hour. The tubes are subsequently blown dry and collapsed to make preforms in the usual way. Al is said to be a key component in producing high RE concentrations in the core centre without clustering effect. It is further disclosed that Al and RE profile lock together in some way which retards the volatility of RE ion. The dip at the core centre is observed both for P and Ge.

Yet another reference may be made to U.S. Pat. No. 5,474,588 (1995) by Tanaka, D. et. al., 'Solution doping of a silica with erbium, aluminium and phosphorus to form an optical fiber' wherein a manufacturing method for Er doped silica is described in which silica glass soot is deposited on a seed rod (VAD apparatus) to form a porous soot preform, dipping the said preform into an ethanol solution containing an erbium compound, an aluminium compound and a phosphoric ester, and desiccating said preform to form Er, Al and P containing soot preform. The desiccation is carried out for a period of 24–240 hours at a temperature of 60°–70° C. in an atmosphere of nitrogen gas or inert gas. This desiccated soot preform is heated and dehydrated for a period of 2.5–3.5 hours at a temperature of 950°–1050° C. in an atmosphere of helium gas containing 0.25 to 0.35% chlorine gas and further heated for a period of 3–5 hours at a temperature of 1400°–1600° C. to render it transparent, thereby forming an erbium doped glass preform. The segregation of $AlCl_3$ in the preform formation process is suppressed due to the presence of phosphorus and as a result the doping concentration of Al ions can be set to a high level (>3 wt %). The dopant concentration and component ratio of Er, Al and P ions are claimed to be extremely accurate and homogeneous in the radial as well as in longitudinal directions.

The drawbacks of the above mentioned processes are as follows:

1. The porous soot layer deposition by following forward pass method, even for germanosilicate composition, leads to variation in composition and soot density along the length of the tube due to simultaneous presintering during the deposition pass and excessive temperature sensitivity.

2. Consolidation of the soaked soot layer containing the RE along with codopant like $P_2O_5$, $GeO_2$ or such refractive index modifiers in presence of a gaseous mixture of $O_2$ and $POCl_3$, $GeCl_4$ etc. requires high flow of the dopant halides to maintain such atmosphere inside the tube.

3. In case of soot layer containing high concentration of $GeO_2$ the sintering in presence of $GeCl_4$ leads to loss of considerable amount of $GeCl_4$ and increase in cost of the preform/fibre.

4. Controlling the proportion of $POCl_3$, $GeCl_4$ etc. during consolidation with the input gases like oxygen becomes critical in order to achieve the desired composition as well as the properties like numerical aperture of the fibre.

5. There is possibility of change in composition of the porous soot layer due to evaporation of the dopants like $P_2O_5$, $GeO_2$ etc. during oxidation and drying steps prior to consolidation.

6. The diffusion of the dopant halides like $POCl_3$, $GeCl_4$ etc through the entire soot deposit during the quick sintering step is difficult because of very short interaction time. Depending on the thickness of the porous soot layer the dopants are mostly confined to a region of the consolidated layer leading to variation in composition and degradation in the optical properties of the fibre.

7. The concentration of the dopants like $P_2O_5$, $GeO_2$ etc. in the consolidated glass layer is very much dependant on the temperature during consolidation because of the complicated process mechanism.

8. The reproducibility and reliability of the process decrease due to the reasons stated above.

OBJECTS OF THE PRESENT INVENTION

The main object of the present invention is to provide a method of fabricating rare earth doped optical fibre which obviates the drawbacks as detailed above.

Still another object of the present invention is to prevent change in composition of the RE containing particulate layer due to evaporation and diffusion of the codopants like $GeO_2$, $P_2O_5$ or such refractive index modifiers during processing steps such as oxidation, drying, sintering subsequent to soaking in RE containing solution.

Yet another object of the present invention is to reduce the evaporation as well as diffusion of the selected codopants like $GeO_2$, $P_2O_5$ or such refractive index modifiers from the particulate layer during the processing stages subsequent to soaking in RE containing solution.

One more object of the present invention is to reduce the flow of dopant halides such as $GeCl_4$, $POCl_3$ or even eliminate their supply during consolidation of the particulate layer.

One another object of the present invention is to ensure uniform distribution of the dopants such as $GeO_2$, $P_2O_5$ across the sintered core layer.

Another object of the present invention is to increase the $GeO_2$ content in the core and make high NA fibre with minimum evaporation of the dopant initially incorporated in the particulate layer and increase the efficiency of dopant incorporation.

Yet another object of the present invention is to increase the reproducibility and reliability of the process to make fibres of given design and optical properties.

Still another object of the present invention is to make the process simple and more cost effective.

One more object of the present invention is to provide a process where the numerical aperture of the fibre is varied from 0.10 to 0.30 maintaining RE concentration in the core between 100 to 6000 ppm along with variation in RE distribution profile in the doped region to produce fibres suitable for application as fibre lasers, amplifiers and sensors for different purposes.

One another object of the present invention is to provide a rare earth doped optical fibre having a RE concentration of 100 to 6000 ppm and a numerical aperture of 0.10 to 0.30.

SUMMARY OF THE PRESENT INVENTION

The novelty of the present invention lies in controlling the evaporation as well as diffusion of $GeO_2$, $P_2O_5$ and/or other refractive index modifying dopants incorporated in the porous silica layer deposited inside a silica glass tube in order to achieve the appropriate NA as well as to obtain the desired composition in the core glass. The evaporation or diffusion mostly takes place during processing stages like oxidation, drying and sintering after incorporation of the RE in the particulate deposit by the known techniques. The present method involves depositing porous silica soot layer containing dopants such as $GeO_2$, $P_2O_5$ inside a silica glass tube at a high temperature by backward deposition technique and presintering the deposited soot layer by backward pass at a suitable temperature with controlled flow of $GeCl_4$ and/or other dopant halides so that a thin layer of the corresponding dopant oxide or a mixture of oxides is deposited over the initially deposited particulate layer. The backward pass indicates that the burner is moving in the opposite direction to the reactants flow through the tube. The thin dopant oxide layer formed during presintering thus covers the surface of the unsintered particulate deposit and prevents reduction in concentration of the dopants in the said deposit due to evaporation and diffusion during further heat treatment. As a result, the sintering step in presence of $GeCl_4$ or such other dopant halides does not become critical unlike in conventional processes to control the proportion of the dopants and achieve the desired composition in the sintered glass layer. It is further possible to reduce the flow of dopant halides or even eliminate their supply during consolidation to achieve the desired fibre properties. The uncertainty in diffusion of the dopants like $GeO_2$, $P_2O_5$ through the entire soot deposit due to poor interaction with the gaseous mixture of oxygen and dopant halides during the quick sintering step in case of known methods is removed as the diffusion takes place from the thin dopant rich layer towards the porous soot layer for sufficient time during the subsequent processing stages of oxidation, drying and sintering after RE incorporation. Any diffusion in the opposite or outward direction also takes place from the outermost thin layer keeping the composition of the inner soot layer undisturbed. The oxidation and sintering are carried out by gradual heating till a clear glassy layer is formed to prevent diffusion of RE and the codopants from the doped region resulting to a minimum change in composition. The method thus ensures uniform distribution of the dopants across the sintered layer with substantial increase in the dopant incorporation efficiency. It is easier to increase the $GeO_2$ content in the core and make high NA fibre by proper control of the flow of reactants during presintering and with minimum evaporation of the dopant from the deposited particulate layer.

The process present invention provides variation in the numerical aperture of the fibre from 0.10 to 0.30 maintaining RE concentration in the core between 100 to 6000 ppm to produce fibres suitable for application as fibre lasers, amplifiers and sensors for different purposes.

By the novel inventive step of depositing porous silica soot layer containing dopants such as $GeO_2$, $P_2O_5$ inside a silica glass tube at a high temperature by backward deposition technique and presintering the deposited soot layer by backward pass in presence of $GeCl_4$ and/or other dopant halides in order to form a thin layer of the corresponding dopant oxide or a mixture of oxides over the initially deposited particulate layer, the evaporation as well as diffusion of the dopants from the deposited particulate layer during processing stages of oxidation, drying and sintering after incorporation of the RE is prevented resulting in a minimum changes in the composition of the porous core layer. Thus the novelty of the process may be said to be due to the fact that the above step makes the process simple and more efficient than the conventional techniques in achieving appropriate composition in the core glass and the associated optical properties in the preform/fibre.

DETAILED DESCRIPTION OF THE PRESENT INVENTION

Accordingly, the present invention provides a method of fabricating rare earth doped optical fibre which comprises depositing $P_2O_5$ and F doped synthetic cladding within a silica glass substrate tube by known method to obtain matched or depressed clad type structure, depositing porous silica soot layer containing refractive index modifiers in the desired proportion at a temperature in the range of 1400–1700° C. by backward deposition to obtain a deposited unsintered core layer, presintering the deposited particulate core layer by backward pass at a temperature in the range of 1000–1400° C. with flow of $GeCl_4$ and other refractive index modifiers, immersing the tube containing the porous soot layer into a solution containing RE salt of concentration in the range of 0.002M to 0.25 M with aluminium salt of concentration in the range of 0.0 M to 1.25 M for a period of 1 to 2 hours, drying the porous layer by flowing dry nitrogen through the tube, heating the tube stepwise in presence of oxygen at a temperature in the range of 600–1100° C., dehydrating the core layer of the tube at a temperature in the range of 800–1200° C. and in presence of $Cl_2$, sintering the core layer in presence of a mixture of oxygen and helium at a temperature in the range of 1400 to 1900° C., collapsing the tube by known method at a temperature in the range of 2000–2300° C. to obtain a preform, overcladding the preform with silica tube by known method, drawing fibres from the preform by the known methods.

In an embodiment of the present invention, the refractive index modifiers are $P_2O_5$, $GeO_2$, and other glass forming oxides.

In another embodiment of the present invention, the flow of $GeCl_4$ or such refractive index modifiers along with the backward pass during presintering provides thin dopant oxide layer over the particulate deposit useful for preventing reduction in concentration of the dopants such as $GeO_2$, $P_2O_5$ in the said soot deposit due to evaporation and/or diffusion during further processing like oxidation, drying and sintering.

In yet another embodiment of the present invention, the $P_2O_5$ and $GeO_2$ concentrations in the porous soot layer are maintained between 1.0 to 5.0 mol % and 3.0 to 15.0 mol % respectively for formation of the core.

In still another embodiment of the present invention, RE salt used is selected from chloride, nitrate or any other salt soluble in solvent used in the process.

In a further embodiment of the present invention, aluminium salt used is selected from chloride, nitrate, and any other salt soluble in solvent used in the process.

In one more embodiment of the present invention, the solution of aluminium and RE salts is prepared using solvent such as alcohol, water.

In one another embodiment of the present invention, the source of chlorine is $CCl_4$ where helium is used as carrier gas.

In an embodiment of the present invention, the proportion of $Cl_2:O_2$ is varied from 1.5:1 to 3.5:1 while the dehydration period lies between 1 to 2 hours.

In another embodiment of the present invention, the mixture of $O_2$ and He is in the range of 4:1 to 9:1.

In still another embodiment of the present invention, the temperature of the particulate layer is increased in steps of 50 to 200° C. during oxidation and sintering.

In yet another embodiment of the present invention, the flow of $GeCl_4$ or the refractive index modifying dopants is reduced or even eliminated during sintering at temperatures of 1200° to 1600° C. to obtain numerical aperture in the range of 0.10 to 0.30.

In one more embodiment of the present invention, wherein because of the presintering, the consolidation step in presence of $GeCl_4$ or such other dopant halides does not become critical in controlling the proportion of the dopants in the sintered glass layer.

In one another embodiment of the present invention, wherein because of the presintering, the uncertainty in diffusion of $GeO_2$, $P_2O_5$ or such refractive index modifying dopants across the entire soot deposit during the rapid sintering in presence of the dopant source as followed in known processes is removed.

In a further embodiment of the present invention, wherein because of the presintering, the diffusion of the dopants such as $GeO_2$ and $P_2O_5$ takes place from the thin dopant rich layer formed during presintering towards the deposited porous soot layer for sufficient time during the processing stages subsequent to soaking into RE containing solution.

In an embodiment of the present invention, wherein because of the presintering, the evaporation/diffusion of the dopants like $GeO_2$ and $P_2O_5$ takes place in the outward direction mostly from the dopant rich thin layer formed during presintering.

In another embodiment of the present invention, wherein because of the presintering, the composition of the deposited soot layer remains undisturbed during the processing stages subsequent to soaking into RE containing solution.

In yet another embodiment of the present invention, wherein because of the presintering, the $GeO_2$ content in the core is increased to make high NA fibre with minimum evaporation of the dopant initially incorporated in the particulate layer.

In still another embodiment of the present invention, wherein because of the presintering, the influence of the process parameters on the level of dopant incorporation into the sintered glass layer is reduced in comparison to the known processes.

In a further embodiment of the present invention, wherein because of the presintering, $GeO_2$, $P_2O_5$ or such other dopants are distributed uniformly across the entire consolidated layer with substantial increase in the dopant incorporation efficiency.

In one more embodiment of the present invention, the advantages described above improve the reproducibility and reliability of the process in producing fibres with desired optical properties.

In one another embodiment of the present invention, the advantages combined make the process simple, efficient and more economic than the known processes.

In still another embodiment of the present invention, the concentration of RE is varied from 100 to 6000 ppm in the doped region and NA between 0.10 to 0.30 to produce fibres suitable for various devices.

In yet another embodiment of the present invention the devices are fibre lasers, amplifiers and sensors for different purposes and other devices where such optical fibres are used.

In a further embodiment of the present invention, there is provided a rare earth doped optical fibre prepared by the aforesaid process and having a RE concentration of 100 to 6000 ppm and a numerical aperture of 0.10 to 0.30.

The invention is further explained with the help of following examples which should not be construed to limit the scope of the invention.

EXAMPLE 1

Deposition of F-doped cladding within a silica tube by MCVD process at a temperature of 1825° C.

Unsintered core deposition at a temperature of 1600° C. by backward pass. The carrier gas flows through the reagent liquids were adjusted to obtain a composition of $SiO_2$=89.1 mol %, $P_2O_5$=1.4 mol % and $GeO_2$=9.5 mol % in the deposited soot layer.

Presintering the deposited unsintered core layer by backward pass at a temperature of 1270° C. $GeCl_4$ was added at this stage.

Dipping the tube with the deposited layer in a solution containing 0.02 (M) $ErCl_3$ and 0.75 (M) $Al(NO_3)_3$ $9H_2O$ for 1.5 hours and draining out the solution slowly.

Drying by maintaining nitrogen gas flow through the tube for 20 min.

Oxidation at temperatures of 800° and 900° C. with 2 passes of the burner at each temperature maintaining a constant $He/O_2$ ratio of 1:6.

Dehydration was carried out at a temperature of 800° C. with a $Cl_2:O_2$ ratio of 2.5:1 for a period of 1 hour 15 minutes.

The tube was heated to increase the temperature stepwise to 1750° C. for complete sintering of the Er & Al containing porous soot layer. During sintering $O_2$ and He flow was in the ratio of 4.5:1.

The collapsing was done in 3 steps in the usual manner.

The NA measured in the fibre was 0.20±0.01.

The $Er^{3+}$ ion concentration in the fibre estimated from its characteristic absorption peaks at selected wavelengths was 1780 ppm.

EXAMPLE 2

Deposition of F-doped cladding within a silica tube by MCVD process at a temperature of 1850° C.

Unsintered core deposition at a temperature of 1610° C. by backward pass. The carrier gas flows through the reagent liquids were adjusted to obtain a composition of $SiO_2$=88.3 mol %, $P_2O_5$=1.3 mol % and $GeO_2$=10.4 mol % in the deposited soot layer.

Presintering the deposited unsintered core layer by backward pass at a temperature of 1300° C. $GeCl_4$ was added at this stage.

Dipping the tube with the deposited layer in a solution containing 0.01 (M) $ErCl_3$ and 0.50 (M) $Al(NO_3)_3$ $9H_2O$ for 1 hour and draining out the solution slowly.

Drying by maintaining nitrogen gas flow through the tube for 15 min.

Oxidation at temperatures of 700°, 825° and 950° C. with 1 passes of the burner at each temperature maintaining a constant $He/O_2$ ratio of 1:5.

Dehydration was carried out at a temperature of 930° C. with a $Cl_2:O_2$ ratio of 2.3:1 for a period of 1 hour.

The tube was heated to increase the temperature stepwise to 1700° C. for complete sintering of the Er & Al containing porous soot layer. During sintering $GeCl_4$ was supplied at 1410° C. along with $O_2$ and He.

The collapsing was done in 3 steps in the usual manner.

The NA measured in the fibre was 0.245±0.01.

The $Er^{3+}$ ion concentration in the fibre estimated from its characteristic absorption peaks at selected wavelengths was 575 ppm.

EXAMPLE 3

Deposition of F-doped cladding within a silica tube by MCVD process at a temperature of 1840° C.

Unsintered core deposition at a temperature of 1580° C. by backward pass. The carrier gas flows through the reagent liquids were adjusted to obtain a composition of $SiO_2$=87.2 mol %, $P_2O_5$=4.8 mol % and $GeO_2$=8.0 mol % in the deposited soot layer.

Presintering the deposited unsintered core layer by backward pass at a temperature of 1170° C. $POCl_3$ was added.

Dipping the tube with the deposited layer in a solution containing 0.01 (M) $ErCl_3$ 0.1 (M) $YbCl_3$ and 0.5 (M) $Al(NO_3)_3$ $9H_2O$ for 1 hour and draining out the solution slowly.

Drying by maintaining nitrogen gas flow through the tube for 15 min.

Oxidation at temperatures of 700°, 800° and 900° C. with 1 passes of the burner at each temperature in presence of $O_2$ and He.

Dehydration was carried out at a temperature of 800° C. with a $Cl_2:O_2$ ratio of 2.5:1 for a period of 1 hour.

The tube was heated to increase the temperature stepwise to 1550° C. for complete sintering of the Er & Yb containing porous soot layer. During sintering $O_2$ and He flow was in the ratio of of 4:1.

The collapsing was done in 3 steps in the usual manner.

The NA measured in the fibre was 0.18±0.01.

The proportion of Yb and Er in the fibre was determined from their characteristic absorption peaks in the spectral attenuation curve.

The main advantages of the present invention are:

1. The thin layer of dopant oxide or a mixture of oxides formed over the particulate deposit during presintering by backward pass along with the flow of $GeCl_4$ or such refractive index modifiers prevents reduction in concentration of the dopants such as $GeO_2$, $P_2O_5$ in the said soot deposit due to evaporation and/or diffusion during further processing like oxidation, drying and sintering.
2. The flow of $GeCl_4$, $POCl_3$ and/or such refractive index modifiers is reduced or even eliminated during sintering at temperatures of 1200° to 1600° C. to obtain numerical aperture in the range of 0.10 to 0.30.
3. The sintering step in presence of $GeCl_4$ or such other dopant halides does not become critical in controlling the proportion of the dopants and achieve the selected composition in the sintered glass layer.
4. The uncertainty in diffusion of $GeO_2$, $P_2O_5$ or such refractive index modifying dopants across the entire soot deposit during the rapid sintering in presence of the dopant source is removed.
5. The diffusion takes place from the thin dopant rich layer towards the porous soot layer for sufficient time during the processing stages subsequent to soaking into RE containing solution.
6. The evaporation/diffusion of the dopants like $GeO_2$, $P_2O_5$ or such refractive index modifying dopants in the opposite or outward direction also takes place from the outermost thin layer keeping the composition of the inner soot layer undisturbed during the processing stages subsequent to soaking into RE containing solution.
7. The method ensures uniform distribution of the dopants across the consolidated layer with substantial increase in the dopant incorporation efficiency.
8. It is easier to increase the $GeO_2$ content in the core and make high NA fibre with minimum evaporation of the dopant initially incorporated in the particulate layer and consequently with reduced flow of the dopant halide during sintering.
9. The improvement in efficiency and control over various parameters increase the reproducibility and reliability of the process for making fibres with the desired optical properties.
10. The advantages combined make the process simple and more economic than the conventional processes.
11. The concentration of RE in the core is varied between 100 to 6000 ppm along with variation in RE distribution profile in the doped region and NA between 0.10 to 0.30 to produce fibres suitable for application as fibre lasers, amplifiers and sensors for different purposes.

The advantages of the process of the present invention over the prior art process are tabulated in Table 1.

TABLE 1

Comparison of results with and without using the presintering step as described in the present invention

| Property | Presintering in presence of dopant halide | Presintering in absence of dopant halide |
| --- | --- | --- |
| Numerical Aperture (for a particular experiment) | 0.20–0.21 | 0.15–0.16 |
| Reduction in $GeCl_4$ flow during presintering and sintering stages | 30–60% | — |
| Increase in Reproducibility | 20–50% | — |

What is claimed is:

1. A process of fabricating rare earth doped optical fibre, wherein an evaporation and diffusion from a deposited porous silica soot layer containing refractive index modifying dopants is controlled by presintering of a porous layer by backward pass along with flow of dopant halides, the process comprising the steps of:

depositing $P_2O_5$ and F doped synthetic cladding within a silica glass substrate tube to obtain matched or depressed clad type structure, depositing a porous silica soot layer containing refractive index modifiers in a desired proportion at a temperature in the range of 1400–1700° C. by a backward deposition to obtain a deposited unsintered core layer, presintering of the deposited particulate core layer by backward pass at a temperature in the range of 1000–1400° C. with flow of said dopant halides and refractive index modifiers, immersing said tube containing the porous silica soot layer into a solution containing RE salt of concentration in the range of 0.002M to 0.25 M with aluminium salt of concentration in the range of 0.0 M to 1.25 M for a period of 1 to 2 hours, drying the porous layer by flowing dry nitrogen through the tube, heating the tube stepwise in presence of oxygen at a temperature in the range of 600–11000° C., dehydrating the core layer of the tube at a temperature in the range of 800–1200° C. and in presence of $Cl_2$, sintering the core layer in presence of a mixture of oxygen and helium at a temperature in the range of 1400 to 1900° C., collapsing the tube at a temperature in the range of 2000–2300° C. to obtain a preform, overcladding the preform with a silica tube, and drawing fibres from the preform.

2. A process as claimed in claim 1, wherein the refractive index modifiers comprise glass forming oxides.

3. A process as claimed in claim 1, wherein the flow of dopant halides and such refractive index modifiers along with the backward pass during presintering provides a thin layer of oxide comprising at least a dopant oxide over the porous layer useful for preventing reduction in concentration of the dopants in the deposited soot layer due to evaporation and/or diffusion during further processing, comprising at least one of oxidation, drying and sintering.

4. A process as claimed in claim 1, wherein the RE salt used is a chloride or a nitrate.

5. A process as claimed in claim 1, wherein the aluminium salt used is chloride, nitrate, and any other salt soluble in solvent used in the process.

6. A process as claimed in claim 1, wherein the solution of aluminium and RE salts are prepared using at least one of alcohol and water.

7. A process as claimed in claim 1, wherein the mixture of $O_2$ and He is in the range of 4:1 to 9:1.

8. A process as claimed in claim 1, wherein the source of chlorine is $CCl_4$ and helium is used as carrier gas.

9. A process as claimed in claim 1, wherein a proportion of $Cl_2:O_2$ is varied from 1.5:1 to 3.5:1 while the dehydration period is between 1 to 2 hours.

10. A process as claimed in claim 1, wherein the temperature of the particulate layer is increased in steps of 50 to 200° C. during sintering.

11. A process as claimed in claim 1 wherein because of the presintering, the flow of refractive index modifiers is reduced or eliminated during sintering at temperatures of 1200° to 1600° C. to obtain numerical aperture in the range of 0.10 to 0.30.

12. A process as claimed in claim 1, wherein because of the presintering, a consolidation step in presence of dopant halides does not become critical in controlling the proportion of the dopants in the sintered glass layer.

13. A process as claimed in claim 1, wherein said presintering, enables diffusion of refractive index modifiers across the entire soot deposit during a rapid sintering in the presence of the dopant source.

14. A process as claimed in claim 1, wherein said presintering, enables diffusion of refractive index modifiers from a thin dopant rich layer formed during presintering towards the deposited porous soot layer for sufficient time during the processing stages subsequent to soaking into RE containing solution.

15. A process as claimed in claim 1, wherein said presintering, enables an evaporation/diffusion of dopant halides to take place in an outward direction from a dopant rich thin layer formed during presintering.

16. A process as claimed in claim 1, wherein said presintering enables a composition of the deposited soot layer to remains undisturbed during processing steps subsequent to soaking into RE containing solution.

17. A process as claimed in claim 1, wherein said presintering enables a $GeO_2$ content in the core to be increased to make high NA fibre with minimum evaporation of a dopant initially incorporated in the particulate layer.

18. A process as claimed in claim 1, wherein said presintering reduces the effect of process parameters on the level of dopant incorporation into the sintered glass layer.

19. A process as claimed in claim 1, wherein said presintering, enables a uniform distribution of dopant halides across an entire consolidated layer with substantial increase in the dopant halide incorporation efficiency.

20. A process as claimed in claim 1 wherein the concentration of RE is varied from 100 to 6000 ppm in a doped region and NA between 0.10 to 0.30.

21. A process as claimed in claim 1, wherein said fibre is useable in at least one of fibre lasers, amplifiers and sensors for different purposes.

22. The process as claimed in claim 1 wherein said dopant halides comprise $GeCl_4$.

23. The process as claimed in claim 2 wherein said glass forming oxides comprise at least one of $P_2O_5$ and $GeO_2$.

24. A process as claimed in claim 23, wherein the $P_2O_5$ and $GeO_2$ concentrations in the porous soot layer are maintained between 1.0 to 5.0 mol % and 3.0 to 15.0 mol % respectively for formation of the core.

* * * * *